United States Patent
Lyons et al.

(10) Patent No.: US 10,380,013 B2
(45) Date of Patent: Aug. 13, 2019

(54) MEMORY MANAGEMENT

(71) Applicant: International Business Machines Corporation, Armonk, NY (US)

(72) Inventors: Michael P. Lyons, Poughkeepsie, NY (US); Andrew Hicks, Wappingers Falls, NY (US); Miles C. Pedrone, Poughkeepsie, NY (US); Yunli Tang, Wappingers Falls, NY (US); Tynan J. Garrett, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/828,727

(22) Filed: Dec. 1, 2017

(65) Prior Publication Data
US 2019/0171557 A1   Jun. 6, 2019

(51) Int. Cl.
*G06F 12/02* (2006.01)
*G06F 12/06* (2006.01)
*G06F 12/0842* (2016.01)
*G06F 9/50* (2006.01)

(52) U.S. Cl.
CPC ......... *G06F 12/023* (2013.01); *G06F 9/5016* (2013.01); *G06F 12/0638* (2013.01); *G06F 12/0842* (2013.01); *G06F 2212/1044* (2013.01); *G06F 2212/657* (2013.01)

(58) Field of Classification Search
CPC .................................................. G06F 12/023
See application file for complete search history.

(56) References Cited

U.S. PATENT DOCUMENTS

| | | |
|---|---|---|
| 5,802,599 A | 9/1998 | Cabrera et al. |
| 6,058,460 A | 5/2000 | Nakhimovsky |
| 6,295,594 B1 | 9/2001 | Meier |
| 6,442,661 B1 | 8/2002 | Dreszer |
| 8,661,221 B2 | 2/2014 | Adderly et al. |
| 9,363,192 B2 | 6/2016 | Padala et al. |
| 9,363,197 B2 | 6/2016 | Waldspurger |
| 2004/0080512 A1 | 4/2004 | McCormack et al. |
| 2008/0104353 A1* | 5/2008 | Madisetti .............. G06F 12/023 711/170 |
| 2009/0083508 A1 | 3/2009 | Perez et al. |
| 2013/0232315 A1* | 9/2013 | Tian .................... G06F 12/0284 711/170 |
| 2014/0337572 A1* | 11/2014 | Weimer ................ G06F 12/023 711/114 |
| 2016/0140035 A1 | 5/2016 | Pronovost et al. |

* cited by examiner

*Primary Examiner* — Edward J Dudek, Jr.
(74) *Attorney, Agent, or Firm* — Nicholas D. Bowman (57) ABSTRACT

Memory management in a computer system is described. Memory is allocated within page-aligned real memory storage to requesting processes. During a normal operation mode, pages of the real memory storage are allocated in accordance with a buddy allocation algorithm. A triggering condition is detected. Responsive to the detection, at least one contiguous page-sized or smaller memory segment that violates the buddy allocation algorithm is allocated to a requesting process.

11 Claims, 9 Drawing Sheets

MEMORY MANAGEMENT

BACKGROUND

The present disclosure relates generally to the field of data processing, and, more particularly, to managing the allocation and deallocation of contiguous segments of real memory.

In computing environments, a memory management system is responsible for managing the allocation and deallocation of real memory (e.g., machine memory such as that which is located on a dual-inline memory module as random access memory (RAM)) among requesting processes (e.g., programs, applications, tasks, threads). The memory is divided up into contiguous, same-sized blocks called pages.

SUMMARY

Embodiments of the present disclosure include a method for managing memory. As part of the method, memory is allocated within page-aligned real memory storage to requesting processes. During a normal operation mode, pages of the real memory storage are allocated in accordance with a buddy allocation algorithm. A triggering condition is detected. Responsive to the detection, at least one contiguous page-sized or smaller memory segment that violates the buddy allocation algorithm is allocated to a requesting process.

Embodiments of the present disclosure further include a computer program product for managing memory. The computer program product is a computer readable storage medium that has program instructions embodied thereon. The program instructions are configured to cause a computer to perform a method. As part of the method, memory is allocated within page-aligned real memory storage to requesting processes. During a normal operation mode, pages of the real memory storage are allocated in accordance with a buddy allocation algorithm. A triggering condition is detected. Responsive to the detection, at least one contiguous page-sized or smaller memory segment that violates the buddy allocation algorithm is allocated to a requesting process.

Embodiments of the present disclosure further include a system for managing memory. The system includes a processor and a computer readable storage medium. The processor is in communication with the a computer readable storage medium and is configured to obtain instructions from the computer readable storage medium that cause the processor to perform a method. As part of the method, memory is allocated within page-aligned real memory storage to requesting processes. During a normal operation mode, pages of the real memory storage are allocated in accordance with a buddy allocation algorithm. A triggering condition is detected. Responsive to the detection, at least one contiguous page-sized or smaller memory segment that violates the buddy allocation algorithm is allocated to a requesting process.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of data processing, and, more particularly, to managing the allocation and deallocation of contiguous segments of real memory. While the present disclosure is not necessarily limited to such applications, various aspects of the disclosure may be appreciated through a discussion of various examples using this context.

Pages from real memory storage may be allocated out as blocks of virtual memory to requesting processes using a buddy allocation algorithm. In embodiments, a buddy allocation algorithm helps to avoid fragmentation of the real memory by limiting how segments of memory within pages can be divided and rejoined (merged) during allocation to and deallocation from processes. For example, in a system where the memory is organized as one megabyte (MB) pages, the memory manager will, in response to a process requesting less than half a megabyte, divide (repeatedly if necessary) a single page into same-sized "buddy" memory segments until the requested memory size is reached. The requested memory segment is allocated to the requesting process and the remaining buddy segment is subject to other allocations (to that process or other processes). Once the segment and its paired buddy segment are both in an unallocated state again, then the two are rejoined into a larger memory segment that can be used to fulfill larger memory requests. This means that contiguous memory segments within pages are only rejoined together to form larger segments for allocation if they are paired buddy memory segments to each other. In other words, a memory segment is subject to being merged with its buddy memory segment or not at all. As used herein, a pair of buddy memory segments refers to two contiguous memory segments that are formed by dividing a single, page-sized or smaller memory segment that itself does not extend across a page-boundary (or other buddy system boundary) into two equal-sized memory segments that can only be merged with each other.

Figure 1:
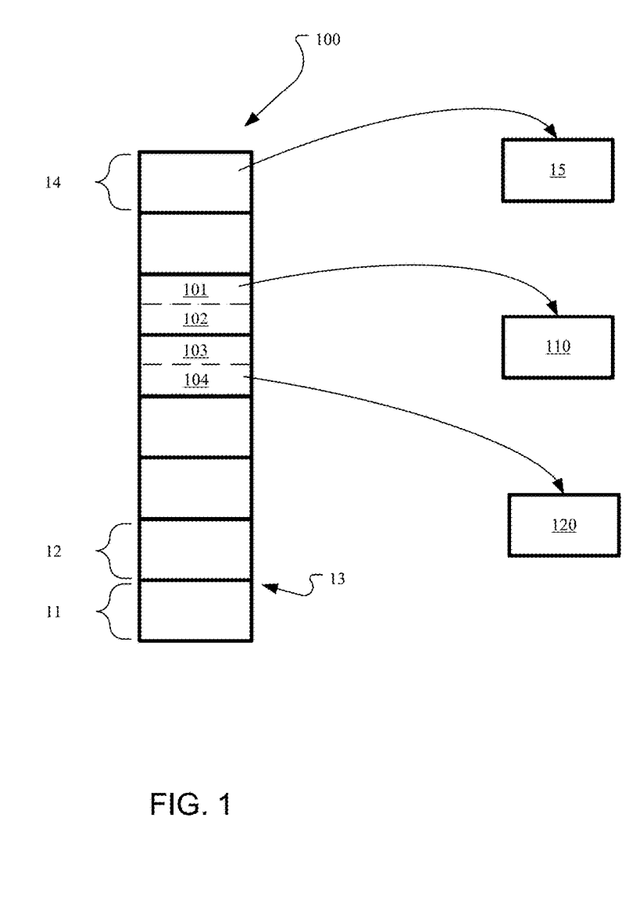
FIG. 1 illustrates a block diagram of an example real memory storage that is allocated with a buddy allocation algorithm to requesting processes, in accordance with embodiments of the present disclosure.

Referring now to the figures, shown in FIG. 1 is a block diagram of an example real memory storage 100 that is allocated with a buddy allocation algorithm to requesting processes, in accordance with embodiments. As shown, the real memory storage 100 is a contiguous block of real memory that is divided into pages (e.g., pages 11 and 12) that have page boundaries (e.g., page boundary 13) in between them.

When the memory management system receives requests for memory allocation, the system allocates the real memory in contiguous, page-sized or smaller memory segments based on the page boundaries (e.g., in a page-aligned manner). For example, in response to a request for a full-page sized memory segment by process 15, the memory management system locates a suitable page 14 and allocates it to the process 15. Later, when the process 15 is no longer in need of the memory, the page 14 is deallocated.

When requesting processes seek less than a full page of memory, the memory management system is able to divide up individual pages into paired buddy memory segments within a particular page. For example, when the memory manager receives a request for a small segment of memory from process 110, the memory manager divides a page into a pair of buddy memory segments 101 and 102 and allocates one of them (segment 101) to the process 110. The other paired buddy memory segment 102 is held in an unallocated state until either (i) it is allocated to process 110 when that process requests more memory, (ii) it is allocated to a different process that requests memory (e.g., process 120), or (ii) the buddy memory segment 101 is deallocated from process 110 and the two buddy memory segments 101 and 102 are reunited and ready for allocation to processes as necessary. Likewise, when the memory manager receives a request for a small segment of memory from process 120, the memory manager divides a different page into another pair of buddy memory segments 103 and 104 and allocates segment 104 to that process.

Continuing the example of FIG. 1, it is important to note some types of rejoinders that the buddy allocation algorithm will not allow when merging memory segments together into larger segments during a normal operation mode. In particular, the algorithm will not allow the joinder of non-buddy memory segments together for allocation, given the increased fragmentation that such joinder would likely cause. For example, upon the allocation of memory segments 101 and 104, the memory segments 102 and 103 would not be joined and as allocated to a process (e.g., process 15) requesting a full page of memory.

In some embodiments, allocation of memory in accordance with a buddy allocation algorithm may allow for pages to be divided up into more than two paired buddy segments. For example, if a process requests only a quarter-page worth of memory, then the memory manager may divide the page up into two paired buddy segments, then sub-divide one of those paired buddy segments into two more, smaller, paired buddy segments, and then allocate one of the smaller segments to the requesting process. The amount of subdivisions possible may be configurable in any given system. By allowing more subdivisions, less memory may be wasted per allocation. For example, if a system with 1 MB pages only allows for a single division, then a process that requests 200 KB of memory would be allocated 512 KB, thereby effectively wasting 312 KB of memory. However, if that same system were to allow for multiple page divisions, then that same requesting process would only be allocated 256 KB of memory, thereby reducing waste.

In embodiments, one basic premise of a buddy memory system is that if two buddy memory segments are empty (unallocated), they will rejoin each other. This pairing of buddy memory segments together helps with defragmentation of the memory system, at least on a minor scale, with each rejoinder. For example, assuming a fresh (fully defragmented) system with 1 MB pages receives a request for 256 KB, the system divides a single page into two 512 KB buddy memory segments. One of those 512 KB buddy memory segments is then subdivided into two 256 KB buddy memory segments, and one of those 256 KB buddy memory segments is allocated to the process requesting the allocation. Once that process releases (deallocates) the 256 KB memory segment, then, if its buddy is still unallocated, the two are merged back into a 512 KB memory segment. Similarly, if the other 512 KB memory segment in the page is still unallocated, then those two buddy memory segments are merged back to form the full page again, which can then be allocated as a full page of memory as needed. As shown, in this example, the ideal net result of this buddy memory system is zero fragmentation of the real memory storage.

As discussed above, during normal operation of a computer, allocation in accordance with a buddy allocation algorithm is often an extremely efficient and effective means for memory allocation. In particular, by strictly limiting how sub-page memory segments are allocated, the likelihood (and rate) of memory fragmentation within real memory storage is reduced. Problems can occur, however, when significant portions of the available memory (e.g., ninety percent) has already been allocated. For example, one problem is thrashing. As used herein, thrashing refers to a situation where memory content is written to hard disk (or other non-volatile, long-term storage) and then needs to be read out again within a short period of time. This inefficient situation may occur significantly more often during periods of high memory allocation. Eventually, high memory allocation may even lead to a crash of address space or even an entire system (e.g., when an important task requests memory allocation but none is available).

Embodiments of the present disclosure recognize that during times of high memory usage continuing to strictly adhere to a buddy allocation algorithm can cause premature system failure. For example, this strict adherence can lead to situations where memory thrashing is occurring even though there are pages that have unallocated buddy memory segments still available in RAM. Under the buddy allocation algorithm, contiguous memory segments large enough to fulfill a given request may be deemed unusable for such an allocation because it would involve joining two non-buddy memory segments to fulfill a single allocation request in violation of the buddy allocation algorithm. For example, if all of the full pages shown FIG. 1, as well as memory segments 101 and 104, were allocated to processes then only segments 102 and 103 would be unallocated in real memory storage 100. If the buddy system were to receive a request for a page-worth of memory, the system would not be able to fulfill the request (even though 102 and 103 form together a contiguous, page-sized memory portion) without violating the buddy allocation algorithm, and the system could crash as a result of this failure.

Embodiments may mitigate these problems by intentionally violating the buddy allocation in certain limited situations. Specifically, by tracking contiguous portions of memory that contain non-buddy memory segments (e.g., through pool assignments) during periods of normal operation, a system can be ready to allocate these memory portions (referred to herein as "memory windows") without regard to the buddy allocation algorithm in times of emergency in order to avoid premature crash of an address space. In embodiments, a memory window may refer to a contiguous page-sized or smaller memory segment that cannot be allocated in accordance with the buddy allocation algorithm.

In some embodiments, memory windowing represents a memory allocation scheme that is used in conjunction with a buddy allocation algorithm. When used together these two represent different sets of constraints that can limit the allocation of portions within the same real memory storage. Thus, assuming optimal usage of the buddy allocation algorithm, the available memory windows (defined by that allocation scheme) become exhausted as portions of the memory are allocated as buddy memory segments in accordance with the buddy allocation algorithm and the memory is never divided and allocated in the memory windows. This is preferred, as the allocation of memory windows can substantially increase memory fragmentation rates. However, in situations where much of the memory has been allocated and some of the memory is fragmented, the memory windows may be the only contiguous portions of memory left unallocated that are large enough to fulfill incoming memory requests. In these scenarios, where allocation according to the buddy allocation algorithm is not possible, allocation of memory windows that violate the buddy allocation algorithm may have significant value.

Figure 2:
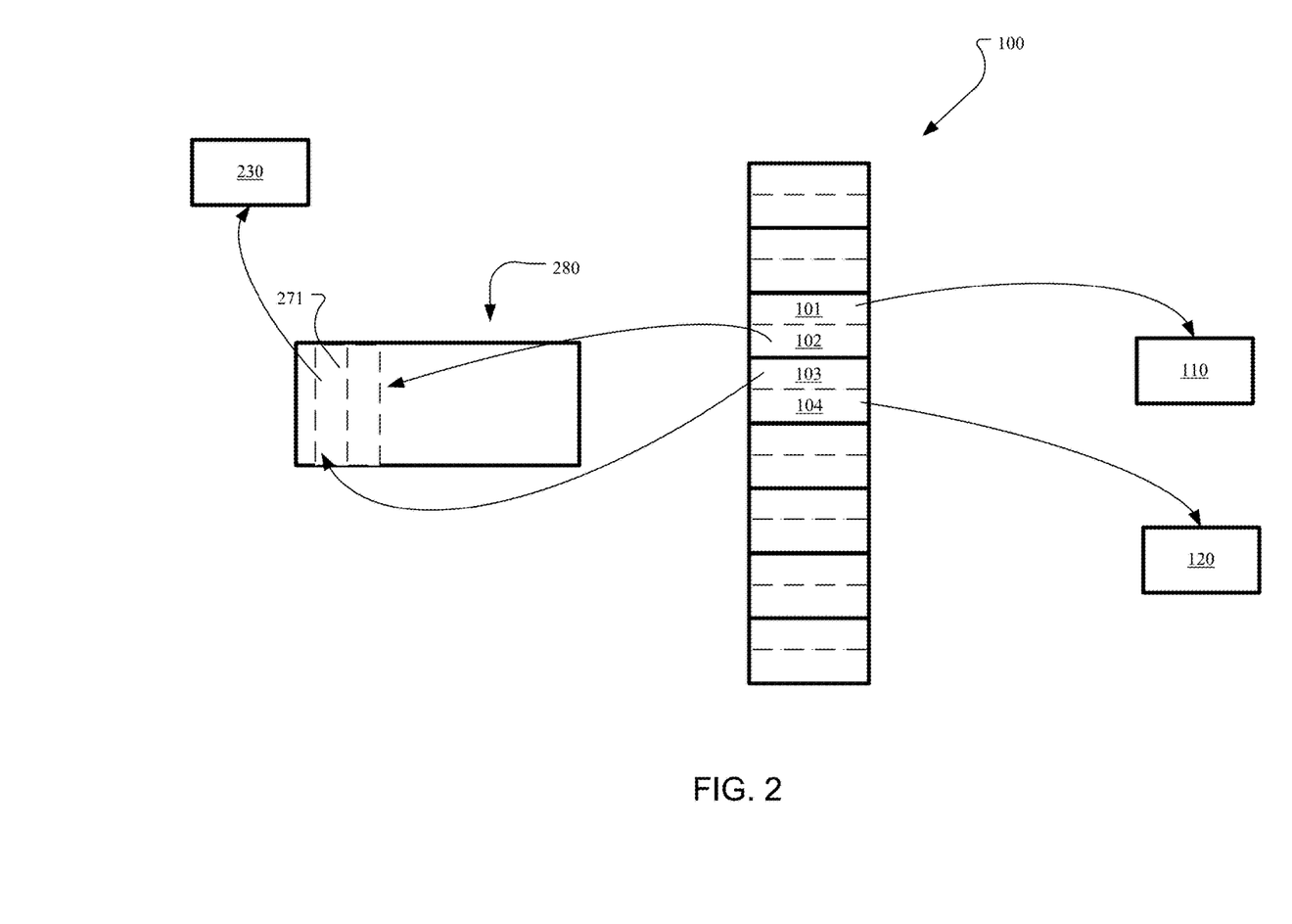
FIG. 2 illustrates a block diagram of an example of portions of the real memory storage being allocated to processes from a free memory window pool without regard for the buddy allocation algorithm, in accordance with embodiments of the present disclosure.

Referring now to FIG. 2, shown is a block diagram of an example of portions of the real memory storage 100 being allocated to processes from a free memory window pool 280 without regard for the buddy allocation algorithm, in accordance with embodiments. As shown, a pool 280 of unallocated contiguous memory segments that cannot be allocated in accordance with the buddy allocation algorithm is maintained. In some embodiments, one or more of these pools may be used merely as organizational structures to manage these unallocated memory segments. As such these segments may not be "allocated" to these pools per se, rather they are assigned to the pools for organizational purposes and remain unallocated (free, unused) memory even when so assigned. Furthermore, in some embodiments, the pools may be organized as one or more queues. For example, memory segments may be allocated from the queues in a first-in first-out manner.

During times of stress on the system, this pool 280 may be utilized to provide memory to requesting processes. For example, as depicted in the figure, unallocated buddy memory segments 102 and 103 are identified as having allocated paired buddy memory segments (101 and 104, respectively) and are added to the pool 280 as a contiguous (full-page) memory window 271. These memory segments are then available for allocation, as memory window 271, without regard for the buddy allocation algorithm.

In some embodiments, memory windows have an advantage of being contiguous memory segments that are subject to allocation without regard to page boundaries. As discussed herein, a single memory window may be made up of memory segments that have had their paired buddy segments allocated to processes. As is clear from the description herein, contiguous memory segments may conceptually overlap with each other. For example, each of the memory segments 102 and 103 can be considered separately form the larger memory window 271, which is itself a contiguous memory segment.

When allocation from the pool 280 becomes necessary (e.g., due to one or more stress thresholds being reached in the system), the memory segments are allocated based on memory windows. The size of the memory window selected can be determined based on the amount of memory requested by the process. For example, as depicted in FIG. 2, the process 230 requests memory allocation. During normal operation mode the process 230 would be allocated memory in accordance with the buddy allocation algorithm; however, in this instance, the memory management system has determined that allocation from the pool 280 is necessary. Here, the process 230 is requesting a full-page sized memory segment. Because the memory segments 102 and 103 are contiguous in the real memory storage 100, they can be allocated to the process 230 as a single memory window 271. If, in the alternative, process 230 requested only half a page of memory, then it would be allocated a smaller memory segment that included only one of memory segments 102 or 103 (not both).

Figure 3:
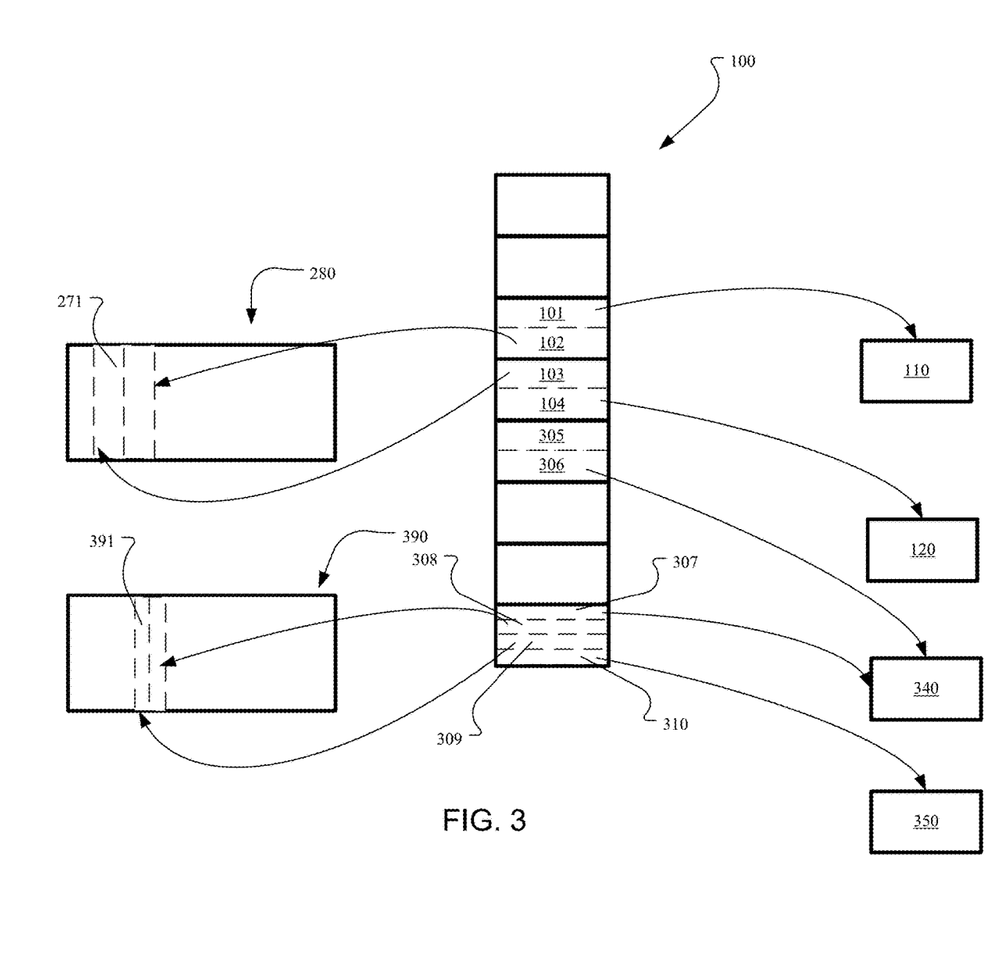
FIG. 3 illustrates a block diagram of an example of portions of the real memory storage being allocated to processes from a plurality of free memory window pools without regard for the buddy allocation algorithm, in accordance with embodiments of the present disclosure.

Referring now to FIG. 3, shown is a block diagram of an example of portions of the real memory storage 100 being allocated to processes from a plurality of free memory window pools 280 and 390 without regard for the buddy allocation algorithm, in accordance with embodiments. In some embodiments, multiple (e.g., two or more, or three or more) pools can be used to better organize memory windows available in the real memory storage 100. Each pool has a different size of memory window that it handles. For example, in a system with 1 MB pages, there could be three pools: one that holds 1 MB windows, another that holds 512 KB windows, and a third that holds 256 KB windows. In some embodiments, the smallest memory window may have a minimum size that twice the size of the smallest portions of memory that the system is configured to allocate. This is because a memory segment that is the smallest size will be a buddy memory segment and not a memory window. For example, if the smallest allocable portion in a particular system is 256 KB, then, in embodiments, the system would not need to maintain (track) 256 KB memory windows.

In some embodiments, each unallocated memory segment in one of the pools may be deemed a part of the largest multi-segment contiguous memory window in which it can be included. In addition, buddy memory segments which are not contiguous with other unallocated memory segments are not assigned to the pools at all. These concepts are shown in FIG. 3. Specifically, as depicted in FIG. 3, three half-page memory segments 102, 103, 305 have paired buddy memory segments (101, 104, and 306, respectively) that are allocated to processes (110, 120, and 340, respectively). In addition, two quarter-page memory segments 308 and 309 have paired buddy memory segments (307 and 310, respectively) allocated to processes (340 and 350, respectively).

In this instance, because they are contiguous with each other, memory segments 102 and 103 are considered to be a single, larger memory window 271 that is assigned to pool 280. Likewise, because they are contiguous with each other, memory segments 308 and 309 are considered part of memory window 391, which is assigned to pool 390 On the other hand, because memory segment 305 is not contiguous with any other unallocated non-buddy memory segments, it is not included in any memory windows assigned to any of the pools.

As memory segments are allocated and deallocated from processes, the content of the pools 280 and 390 can change rapidly. For example, if memory segment 101 is deallocated from process 110, then memory segment 102 will be removed from the pools (e.g., to be rejoined with segment 102 as single page of memory that can be reallocated to other processes in accordance with the buddy allocation algorithm), and memory segment 103 will also be removed from the pools, causing memory window 271 to no longer exist. Likewise if memory segment 102 is allocated to process 110 or another process, the same removal of memory segment 103 from the pools will occur. The reverse concept is also possible. For example, if a particular unallocated memory segment is not included in one of the pools and an adjacent, non-buddy memory segment is deallocated, then these segments could form a new memory window that is handled one of the pools 280 or 290, depending on its size.

In some embodiments, it is contemplated that the change in allocation status of a single memory segment could cause a change in the size of memory window, such that it moves from one of the pools 280 or 290 to the other. For example, allocation of a memory segment could cause the memory window of which it was part to become a smaller memory window. Likewise, the deallocation of a memory segment could cause an existing memory window to become a larger memory window that includes the segment.

It is significant to note that, in some embodiments, allocations according to the buddy allocation algorithm may always take precedence over allocations of memory windows that would be in violation of the algorithm. For example, in reference to FIG. 3, if the system received a request for a half-page worth of memory, the system would allocate segment 305 in accordance with the buddy allocation algorithm, rather than allocate memory window 391 in violation of the algorithm. Similarly, in system where only full pages and quarter pages remain for allocation, the system, upon receiving a request for a half-page of memory, would divide a full page into two half-page buddy memory segments to fulfill the request rather than combine two non-buddy quarter pages into a half-page memory window (because allocation of the window would violate the buddy allocation algorithm).

Figure 4:
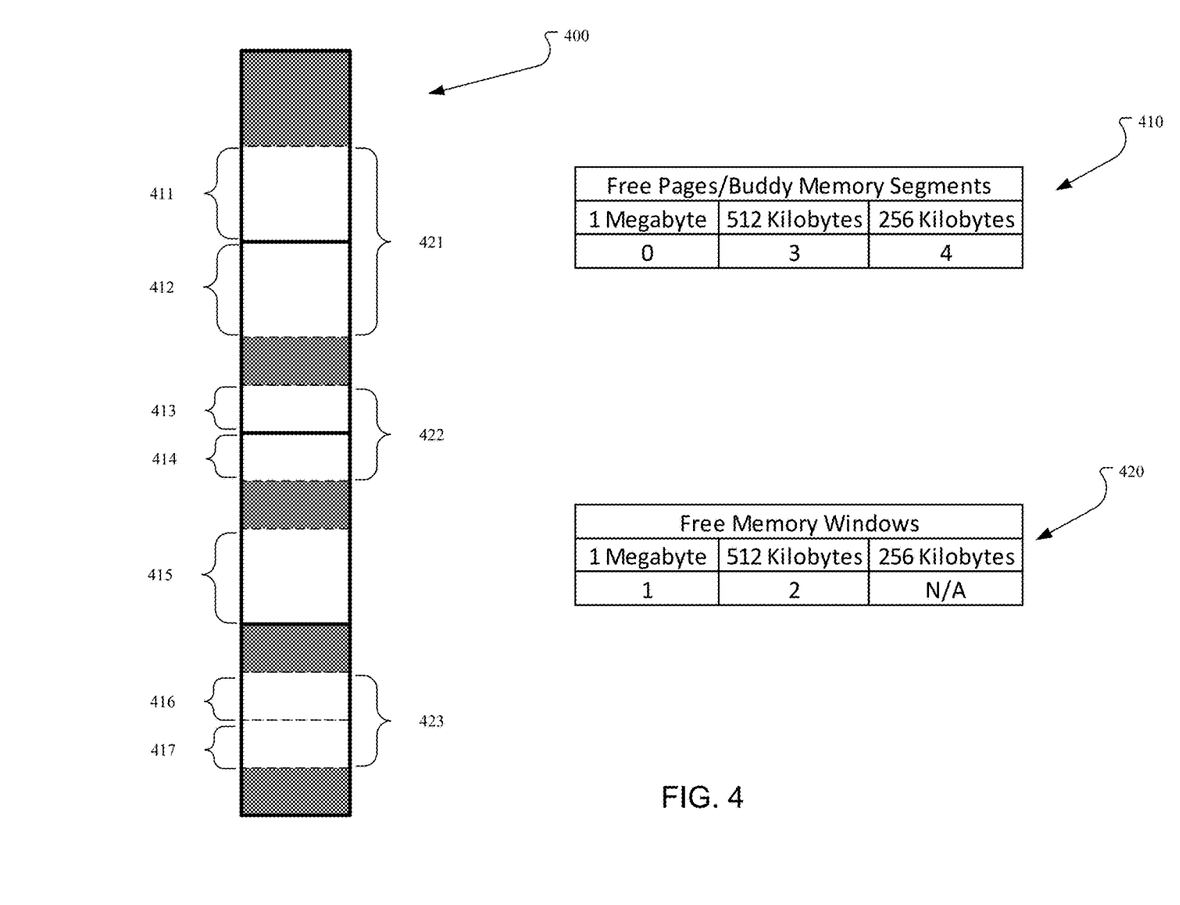
FIG. 4 illustrates a block diagram of an example memory management system having two tables for managing free memory within real memory storage, in accordance with embodiments of the present disclosure.

Referring now to FIG. 4, shown is a block diagram of an example memory management system having two tables 410 and 420 for managing free memory within real memory storage 400, in accordance with embodiments. In some embodiments, these tables are used in addition to standard paging tables. The first table 410 is configured to track free pages and buddy memory segments within the real memory 400, while the second table 420 is configured to track free (page-sized or smaller) memory windows therein. Specifically, while both tables 410 and 420 track contiguous blocks of memory, the first table 410 is designed to take page boundaries and buddy pairings into account when designating memory blocks as particular sizes, while the second table 420 is designed to not take these boundaries and pairings into account. In some embodiments, a memory management system may be able to use scans of standard paging tables to determine whether given segments of memory are allocated or unallocated to processes. For example, the paging table may include a bit that indicates whether a block of memory is free or in use. For another example, a zeroed out segment of memory can serve to indicate that the segment is free.

In the depicted example, the grayed sections of real memory 400 represent allocated memory segments, the white sections represent unallocated memory segments, the pages are each 1 MB, and the smallest allocable unit is 256 KB. Table 410 indicates that there are no free memory segments (i.e., pages) of 1 MB, there are three free buddy memory segments of 512 KB (i.e., memory segments 411, 412, and 415), and four free buddy memory segments of 256 KB (i.e., memory segments 413, 414, 416, and 417). Table 420 identifies memory windows that take in account continuities between the memory segments described in Table 410. Thus, table 420 indicates that the real memory 400 includes one memory window of 1 MB (i.e., memory window 421) and two memory windows of 512 KB (i.e., memory windows 422 and 423). Because the smallest unit is 256 KB, there are no memory windows of that size.

The two 512 KB memory windows, 422 and 423, provide examples of two different types of buddy system boundaries that limit how memory segments can be allocated in accordance with a buddy allocation algorithm. Specifically, memory window 422 violates the buddy allocation algorithm by extending across a page boundary (between non-paired buddy memory segments 413 and 414), which is a first type of buddy system boundary. On the other hand, memory window 423 violates the buddy allocation algorithm by extending across a non-page boundary (between non-paired buddy memory segments 416 and 417), which is a second type of buddy system boundary. Because they extend across these buddy system boundaries, neither memory window 422 nor memory window 423 would be subject to allocation during a normal operation mode. Instead, only their constituent buddy memory segments (413, 414, 416, and 417) would subject to allocations, separately from each other. And, as long as the system continued in normal allocation mode, these 256 KB buddy memory segments would not be subject to allocations as part of larger (e.g., 512 KB) memory segments until their respective paired buddy memory segments were deallocated so that mergers of the paired buddy memory segments could occur.

As discussed herein, some embodiments recognize that, where possible, it is appropriate to limit the amount of memory that is allocated without regard to a system's normal buddy allocation algorithm. While these allocations may increase the memory usage threshold before a system crash, they can also put increased strain on the system by, among other things, significantly increasing the rate of memory fragmentation. Based on this recognition, some embodiments are designed to mitigate the effects of memory allocations outside of the buddy allocation algorithm. In some such embodiments, the effects are mitigated by only performing these types of allocations in situations where a triggering condition is detected. Furthermore, in some embodiments, the system may be configured to allocate memory windows only when there are no available free pages or free buddy memory segments of the requested size or larger.

Likewise, some embodiments further limit the damaging effects of these types of memory window allocations by only making them as short-term "lends" of memory, at least where possible. For example, these allocations may be made only to (or with a preference for) short-running tasks. Specifically, tasks may be deemed short running only if they are configured to run for less than a certain number of clock cycles (e.g., below a 1000-cycle threshold). By limiting these allocations to short-running tasks, the negative impact of these types of allocations may be reduced. This occurs at least in part because a given short-term lend is unlikely to cause damaging memory fragmentation. For example, if a 512 KB segment of 1 MB page of memory is currently allocated to a normal (e.g., long running) task, allocating the paired buddy 512 KB as part of a memory window (e.g., along with another adjacent segment 512 KB as 1 MB memory window) to a short-term task (or to a normal task for only short period of time) is unlikely to be a problem as the paired buddy segment is likely to be deallocated again long before the normal task deallocates its portion of the page.

Furthermore, in some embodiments, yet another means for reducing the impact of these memory window allocations is to begin defragmentation of memory as soon as possible (so that less of these allocations are necessary). And, once new, defragmented pages become available, these allocations may be undone and the affected processes can be allocated memory from the new pages.

Figure 5:
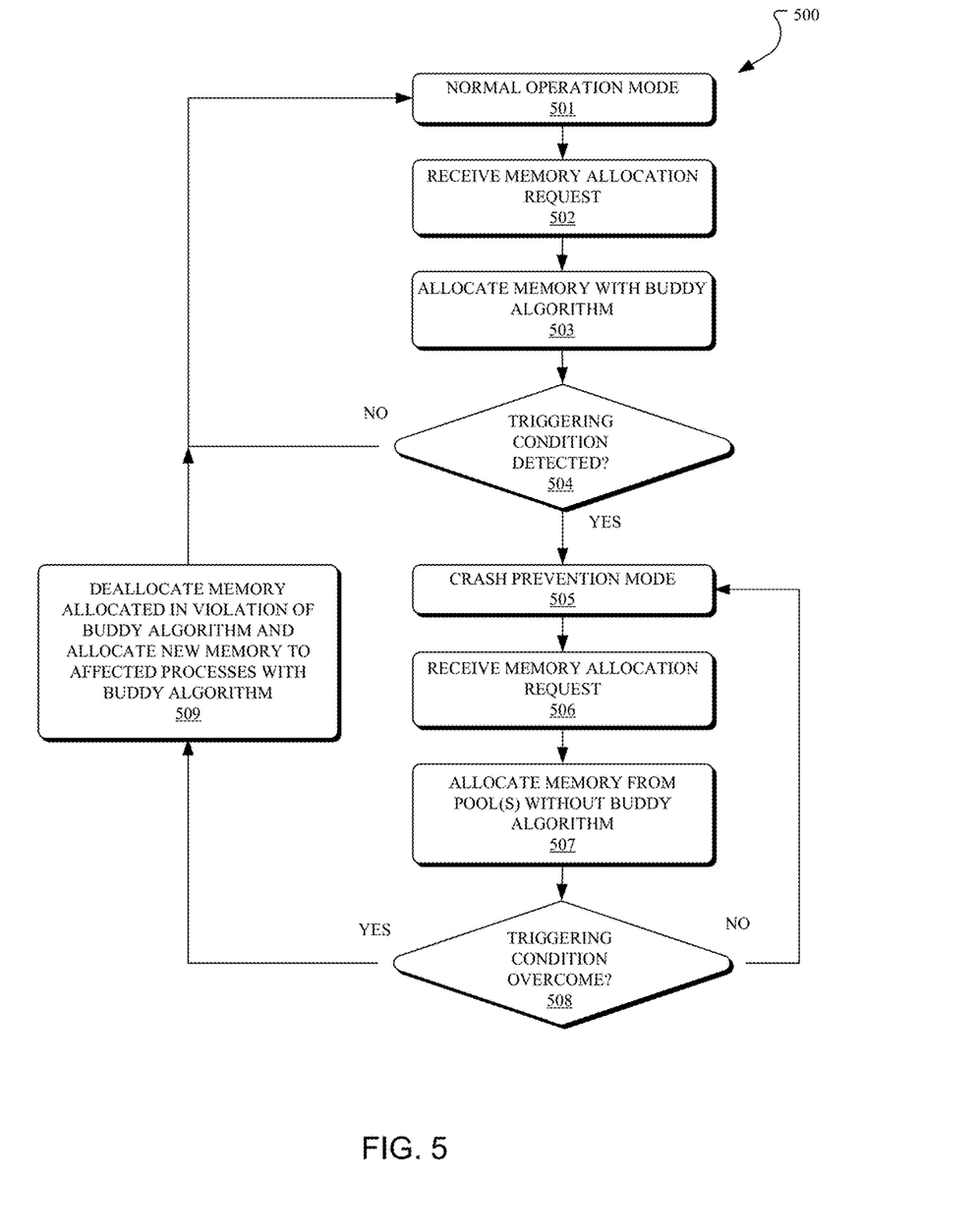
FIG. 5 illustrates a flow diagram of a method for managing the allocation of memory, in accordance with embodiments of the present disclosure.

Referring now to FIG. 5, shown is a flow diagram of a method 500 for managing the allocation of memory, in accordance with embodiments. In some embodiments, operations of the method 500 may be performed by a processor of a computer (e.g., computer system 901 of FIG. 9). The method 500 may begin at operation 501, wherein the computer system is in a normal operation mode. Per operation 502, the memory management system receives a request for memory allocation from a process. Per operation 503, the requested memory is allocated in accordance with the buddy allocation algorithm because the system is in the normal operation mode. Per operation 504, a determination is made as to whether a triggering condition is detected. In some embodiments, a triggering condition includes a specific threshold being achieved. For example, the threshold may be a memory usage threshold, a memory fragmentation threshold, or other memory availability threshold (e.g., less than 10% of the real memory storage is available for allocation in accordance with the buddy allocation algorithm, no memory of the requested size or larger is available for allocation in accordance with the buddy allocation algorithm, or an unexpected spike in memory requests occurs). If the determination in operation 504 is that there is no triggering condition, then the method loops back to operation 501 and continues the normal operation mode. If, however, the triggering condition is detected in operation 504, then, per operation 505, the system enters a crash prevention mode.

Once the system is in a crash prevention mode, memory allocation requests are handled differently by the memory management system. Per operation 506, a memory allocation request is received from a process. Rather than allocating using the usual buddy allocation algorithm, the memory management system, per operation 507, allocates memory to the requesting process, if necessary, from one or more free memory pools without regard to the buddy allocation algorithm. Per operation 508, a determination is made as to whether the triggering condition is overcome. In some embodiments, this determination may involve the same or different threshold as was used in the determination of operation 504. If the determination in operation 508 is that the triggering condition has not been overcome, then the method loops back to operation 505 and the system remains in the crash prevention mode.

Once the triggering condition has been overcome (e.g., through sufficient memory defragmentation, through a reduction in the spike for memory requests, or through deallocations of many memory segments at one time), then, per operation 509, any memory that was allocated in violation of the buddy allocation algorithm during the crash prevention mode is deallocated and the affected processes are allocated new memory segments in accordance with the buddy allocation algorithm. Once operation 509 is complete, the system returns to the normal operation mode, per operation 501. In some embodiments, the system may also, upon completion of operation 509, begin defragmentation of the memory, if such a process is deemed necessary.

While an example embodiment of the method 500 is described herein, it is contemplated that many variants of this example may be possible. For example, in some embodiments, a system may keep track of multiple different triggering conditions or may have multiple thresholds that trigger different outcomes. In one such instance, a system could have two or more triggering conditions (or different thresholds) that each trigger one of (i) beginning memory defragmentation, (ii) beginning pool assignments, (iii) beginning allocation without regard to (e.g., in violation of) the buddy allocation algorithm to short-running tasks, and (iv) beginning allocation without regard to the buddy allocation algorithm to long-running tasks. By having these different thresholds, embodiments may be able to take a more granular approach to solving potential memory allocation problems. For example, a system could start in normal operation mode, begin using/maintaining memory pools responsive to reaching a first level of memory allocation, leave the normal operation mode but only allocate without regard to the buddy allocation algorithm to only short running tasks responsive to a second level of memory usage, and allocate without regard to the buddy allocation algorithm to all tasks (or regardless of task term) responsive to a third level of memory usage.

Furthermore, in some embodiments, preference for allocating in accordance with the buddy allocation algorithm may be maintained (even in a crash prevention mode), such that when possible memory is not allocated as memory windows. Some embodiments may even take this a step further and maintain a hierarchy of allocation types with allocation preferences being (from highest to lowest): (i) allocating an available buddy memory segment (e.g., one that is unallocated but whose paired buddy is allocated) that is large enough to fulfill the memory request, (ii) dividing up a page (or memory segment that is larger than the request) into a pair of buddy memory segments and then allocating one of those buddy memory segments to fulfill the request, and (iii) allocating a memory window.

Figure 6:
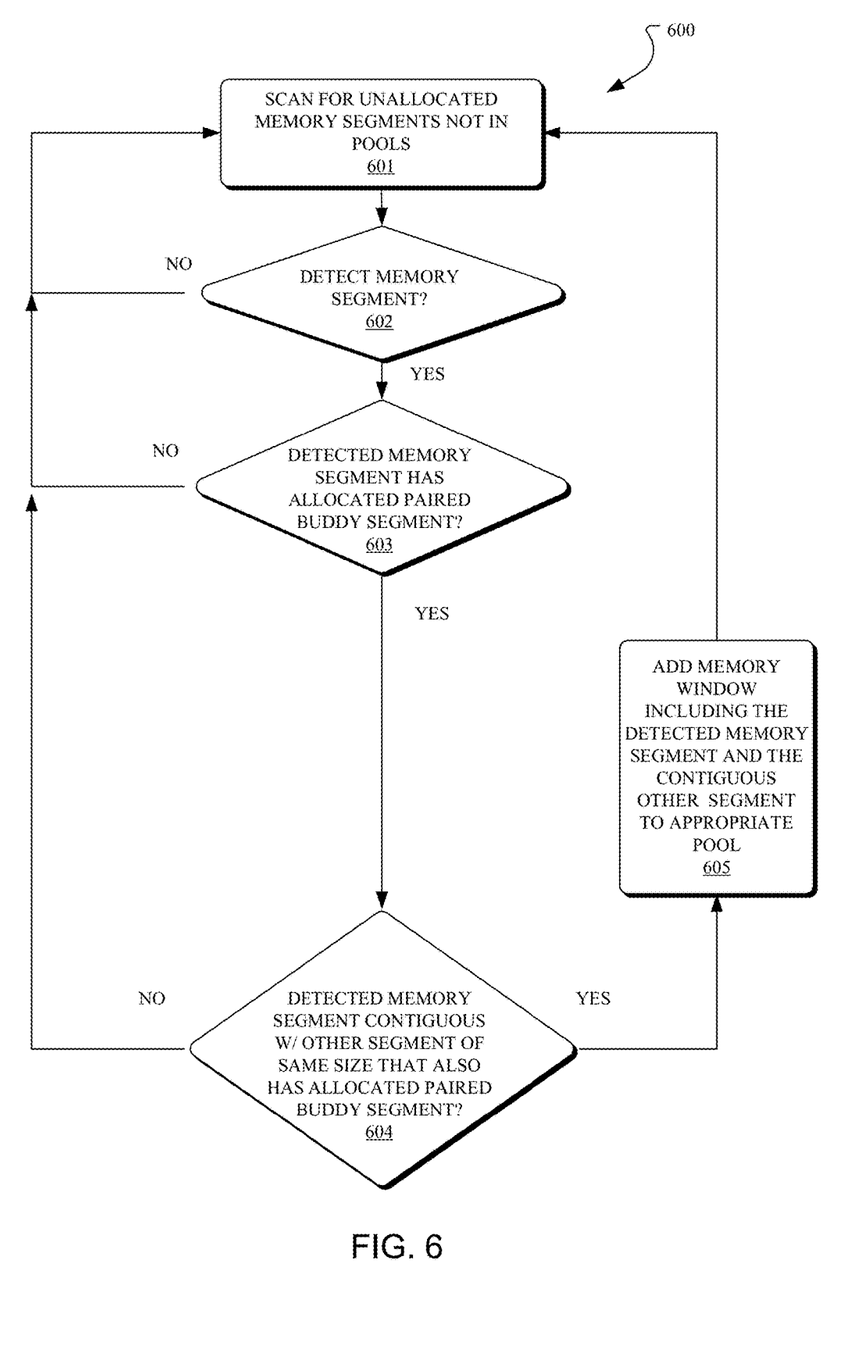
FIG. 6 illustrates a flow diagram of a method for sorting unallocated memory segments among free memory window pools, in accordance with embodiments of the present disclosure.

Referring now to FIG. 6, shown is a flow diagram of a method 600 for sorting unallocated memory segments among free memory window pools, in accordance with embodiments. In some embodiments, operations of the method 600 may be performed by a processor of a computer (e.g., computer system 901 of FIG. 9). The method 600 may begin at operation 601, wherein a scan is made for unallocated memory segments that are not already in a free memory window pool (as part of a memory window). Per operation 602, a determination is made as to whether such an unallocated memory segment is detected. If not, then the method loops back to operation 601. In some embodiments, these memory scans may be done periodically, at regular intervals, and/or responsive to certain events. If an unallocated memory segment is detected in operation 602, then, per operation 603, a determination is made as to whether the memory segment has a paired buddy memory segment that is currently allocated to a process. If not, then the method loops back to operation 601. In embodiments, this occurs because the memory window pools are not designed to manage buddy memory segments that are still together and unallocated (e.g., where a full page-aligned memory block is unallocated). Instead, these pages of memory are managed in the normal manner and are subject to allocation in accordance with the buddy allocation algorithm.

If, per operation 603, a determination is made that the detected memory segment does have an allocated paired buddy memory segment, then per operation 604, the system determines whether the detected memory segment is contiguous with another unallocated memory segment of the same size that also has an allocated paired buddy memory segment. If not, then the method loops back to operation 601. In embodiments, this occurs because the memory window pools are not designed to manage these types of memory segments, as they can be allocated in the normal manner, per the buddy allocation algorithm. If, per operation 604, a determination is made that these two non-paired buddy memory segments are contiguous with each other, then, per operation 605, a memory window including the these memory segments is added to the appropriate pool. After the memory window is added to the pool, the method loops back to operation 601.

Figure 7:
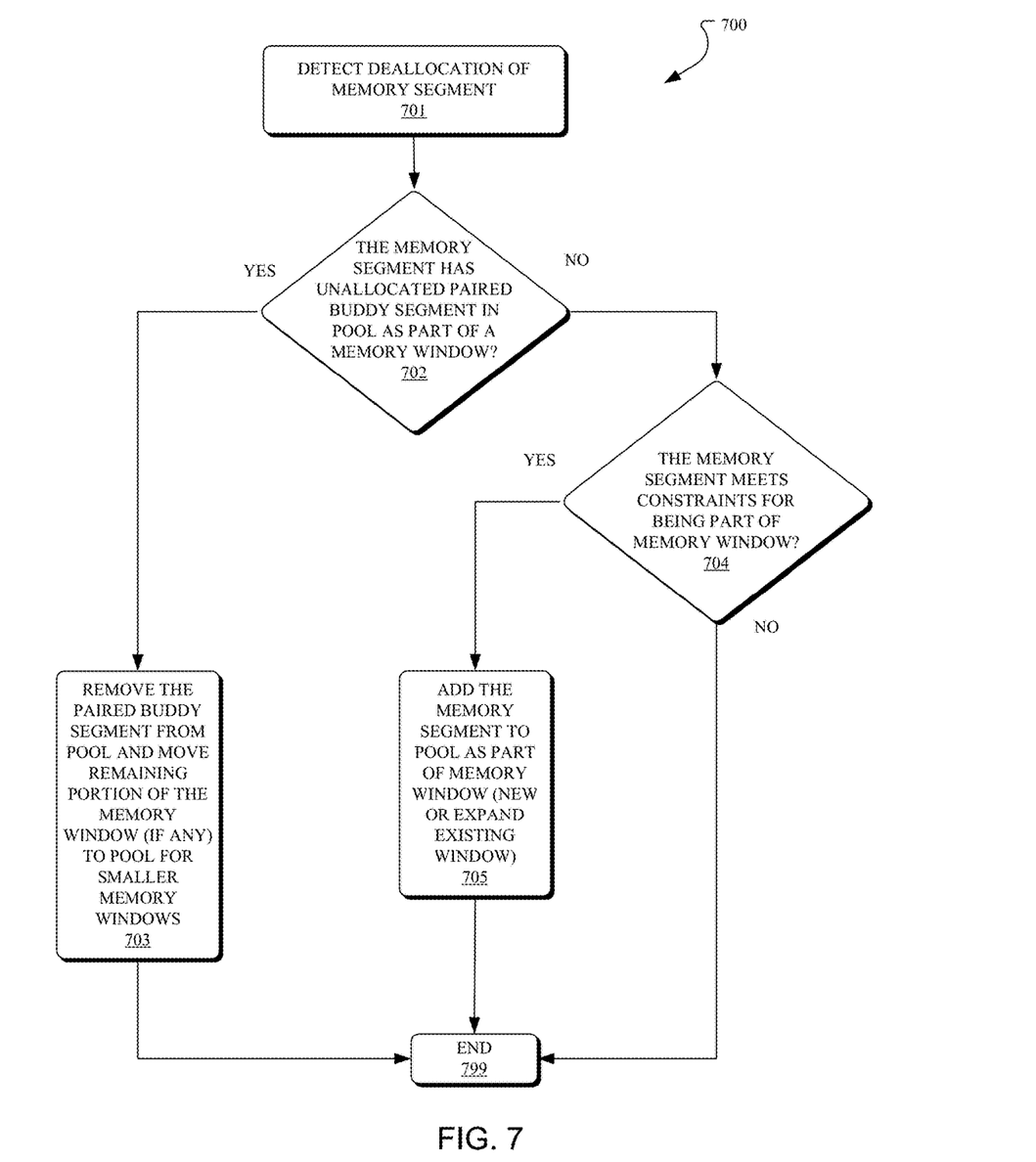
FIG. 7 illustrates a flow diagram of a method for managing memory windows located in free memory window pools responsive to a deallocation of a memory segment, in accordance with embodiments of the present disclosure.

Referring now to FIG. 7, shown is a flow diagram of a method 700 for managing memory windows located in (e.g., assigned to) free memory window pools responsive to a deallocation of a memory segment, in accordance with embodiments. In some embodiments, operations of the method 700 may be performed by a processor of a computer (e.g., computer system 901 of FIG. 9). Furthermore, in some embodiments, operations of the method 700 are completed only after the method 600 has been fully completed. That is to say, by repeatedly iterating through method 600, all of the buddy memory segments that qualify for assignment to memory pools as part of memory windows are assigned to the correct pool. After these initial assignments are completed in accordance with the method 600, method 700 is then used to modify the pools, as appropriate, when memory segments are deallocated.

The method 700 may begin at operation 701, wherein a deallocation of a memory segment is detected. In operation 702, a determination is made as to whether the detected memory segment has an unallocated paired buddy memory segment that is currently in a pool as part of a memory window. If so, then, per operation 703, the paired buddy memory segment and any other memory segment that is only in the pool because it is contiguous with the paired buddy memory segment are removed from the memory window (and the pools) and the remaining one or more portions of that memory window (if any exist) are moved to one or more pools for smaller memory windows. The method then ends, per operation 799.

Returning to operation 702, if the detected deallocated memory segment does not have an unallocated paired buddy segment already in a memory pools, then, per operation 704, a determination is made as to whether the detected deallocated segment meets the constraints (described herein) for being part of a memory window. If not, then the method ends, per operation 799, without the detected memory segment being added to one of the pools as part of a memory window. If, however, a determination is made in operation 704 that the memory segments meets the required constraints, then, per operation 705, the memory segment is added to the appropriate pool as part a new memory window or as part of an expanded memory window. The method then ends, per operation 799.

Figure 8:
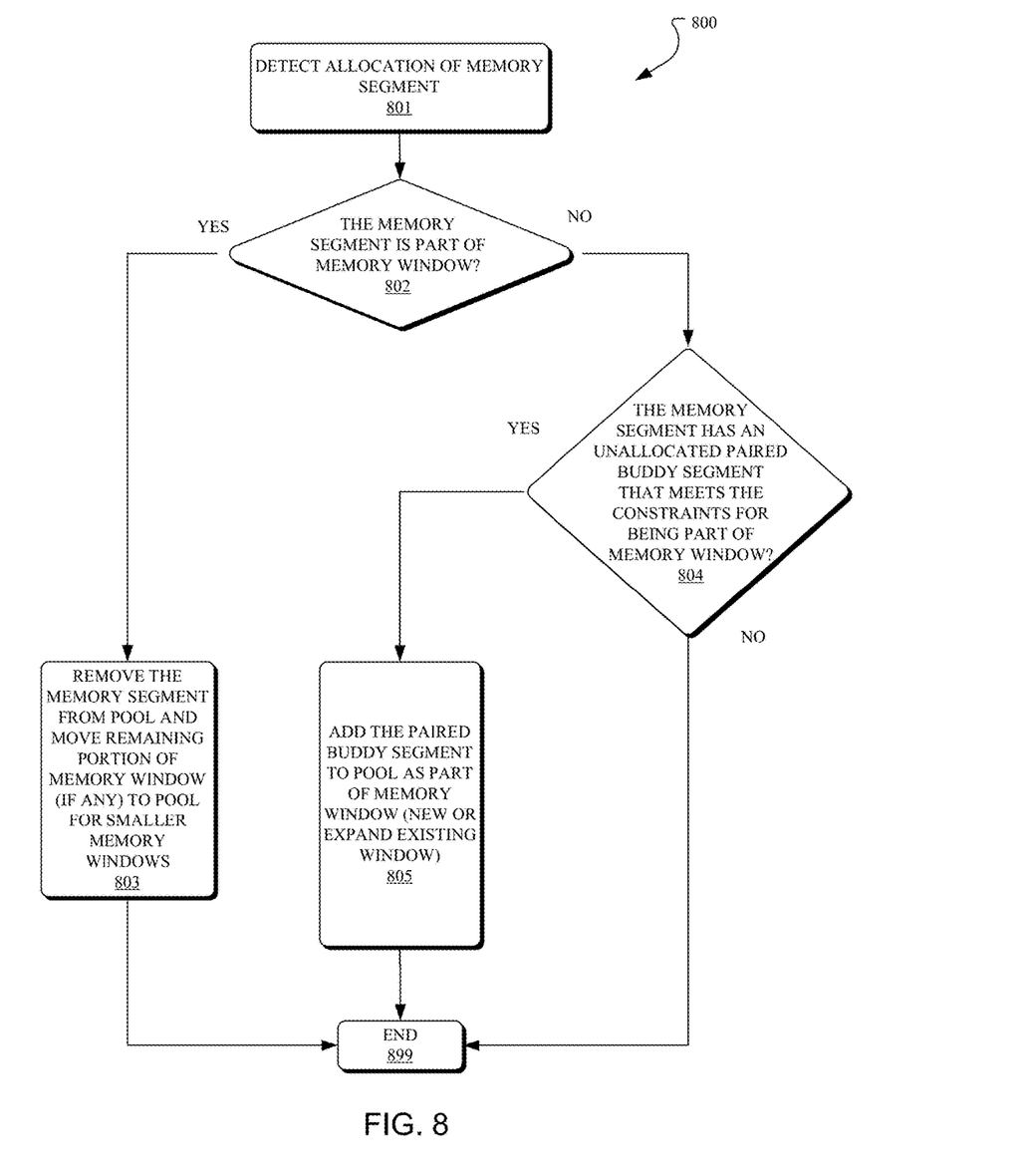
FIG. 8 illustrates a flow diagram of a method for managing memory windows located in free memory window pools responsive to an allocation of a memory segment, in accordance with embodiments of the present disclosure.

Referring now to FIG. 8, shown is a flow diagram of a method 800 for managing memory windows located in free memory window pools responsive to an allocation of a memory segment, in accordance with embodiments. In some embodiments, operations of the method 800 may be performed by a processor of a computer (e.g., computer system 901 of FIG. 9). Furthermore, in some embodiments, operations of the method 800 are completed only after the method 600 has been fully completed. This may be similar to the delay in use described with respect to operations of the method 700, described herein. That is to say, by repeatedly iterating through method 600, all of the buddy memory segments that qualify for assignment to memory pools as part of memory windows are assigned to the correct pool. After these initial assignments are completed in accordance with the method 600, method 800 is then used to modify the pools, as appropriate, when memory segments are allocated.

The method 800 may begin at operation 801, wherein an allocation of a memory segment is detected. In operation 802, a determination is made as to whether the detected memory segment was part of a memory window. If yes, then, per operation 803, the detected memory segment memory and any other memory segment that is only in the pool because it is contiguous with the detected memory segment are removed from the memory window (and the pools) and the remaining one or more portions of that memory window (if any exist) are moved to one or more pools for smaller memory windows. The method then ends, per operation 899.

Returning to operation 802, if the detected allocated memory segment was not part of a memory window, then, per operation 804, a determination is made as to whether the detected memory segment has an unallocated paired buddy memory segment that now meets the constraints for being part of a memory window. If not, the method ends, per operation 899. If yes, then, per operation 805, the paired buddy memory segment is added to one of the pools as part of a new memory window or as part of an expanded memory window. The method then ends, per operation 899.

In some embodiments, some or all of operations of the methods described herein that relate to the management of free memory window pools (e.g. the assignment of buddy memory segments to pools as part of memory windows or the allocation of memory from pools) may be performed by a secondary processor, such as a system assist processor, rather than a single, main processor. One potential advantage of using a system assist processor is that it may be able to handle workload of managing the pools without needing to burden the main processor. On the other side, one potential disadvantage of using a system assist processor is that it may be continuously behind by a few cycles in tracking (mapping) allocations made by the main processor, so the free memory pools may not be completely updated. Put another way, having a main processor manage the memory pools may be more accurate but it also requires placing some burden on that processor.

Some embodiments of the present disclosure may offer various technical computing advantages over the prior art. These computing advantages address problems arising in the realm of memory management and the associated problems of computer performance and efficiency particularly as they relate to memory allocation during times of high stress on a computer system. Implementation of embodiments of the methods described herein can result in improved system performance and technical computing advantages. Embodiments herein recognize that allocating memory without regard to a buddy allocation algorithm may add to the total memory that is available for allocation at a given time.

Figure 9:
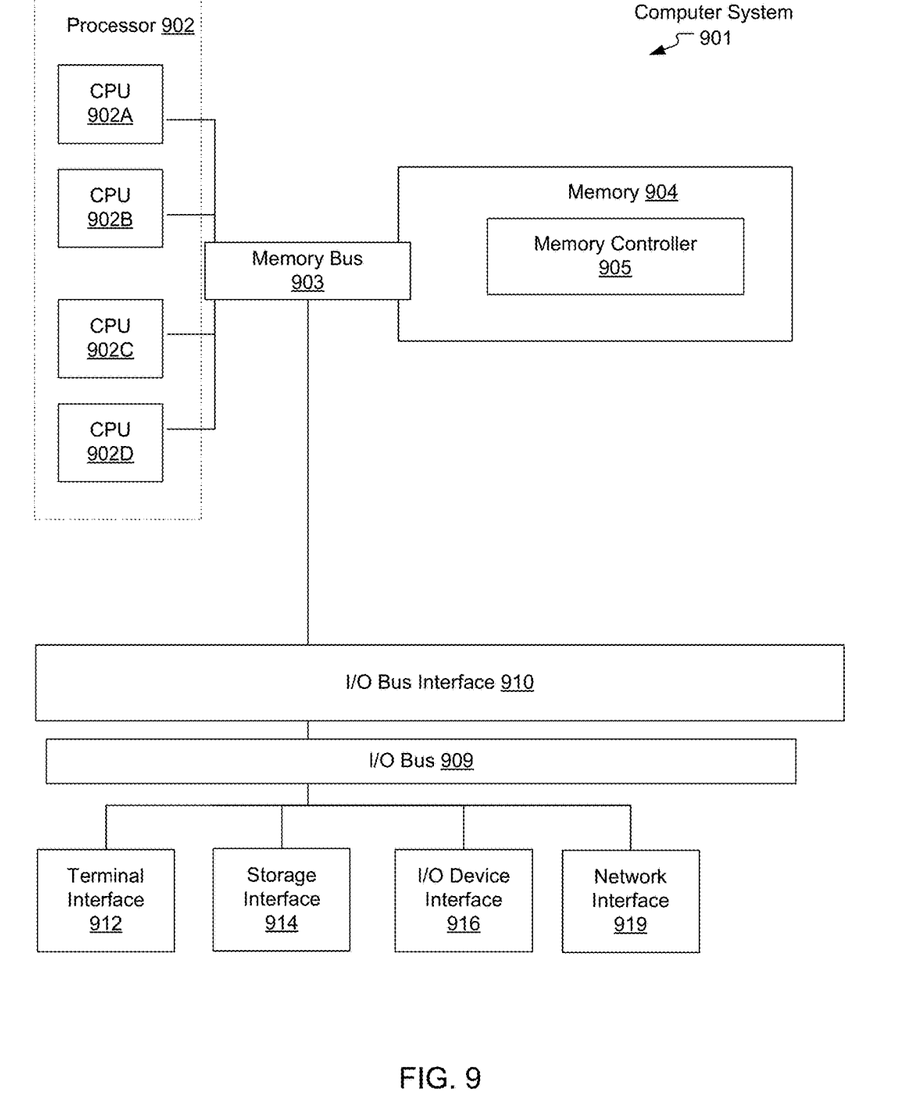
FIG. 9 illustrates a high-level block diagram of an example computer system that may be used in implementing embodiments of the present disclosure.

Referring now to FIG. 9, shown is a high-level block diagram of an example computer system (i.e., computer) 901 that may be used in implementing one or more of the methods or modules, and any related functions or operations, described herein (e.g., using one or more processor circuits or computer processors of the computer), in accordance with embodiments of the present disclosure. In some embodiments, the major components of the computer system 901 may comprise one or more CPUs 902, a memory subsystem 904, a terminal interface 912, a storage interface 914, an I/O (Input/Output) device interface 916, and a network interface 919, all of which may be communicatively coupled, directly or indirectly, for inter-component communication via a memory bus 903, an I/O bus 909, and an I/O bus interface unit 910.

The computer system 901 may contain one or more general-purpose programmable central processing units (CPUs) 902A, 902B, 902C, and 902D, herein generically referred to as the processer 902. In some embodiments, the computer system 901 may contain multiple processors typical of a relatively large system; however, in other embodiments the computer system 901 may alternatively be a single CPU system. Each CPU 902 may execute instructions stored in the memory subsystem 904 and may comprise one or more levels of on-board cache.

In some embodiments, the memory subsystem 904 may comprise a random-access semiconductor memory, storage device, or storage medium (either volatile or non-volatile) for storing data and programs. In some embodiments, the memory subsystem 904 may represent the entire virtual memory of the computer system 901, and may also include the virtual memory of other computer systems coupled to the computer system 901 or connected via a network. The memory subsystem 904 may be conceptually a single monolithic entity, but, in some embodiments, the memory subsystem 904 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 904 may contain elements for control and flow of memory used by the Processor 902. This may include a memory controller 905.

Although the memory bus 903 is shown in FIG. 9 as a single bus structure providing a direct communication path among the CPUs 902, the memory subsystem 904, and the I/O bus interface 910, the memory bus 903 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 910 and the I/O bus 909 are shown as single respective units, the computer system 901 may, in some embodiments, contain multiple I/O bus interface units 910, multiple I/O buses 909, or both. Further, while multiple I/O interface units are shown, which separate the I/O bus 909 from various communications paths running to the various I/O devices, in other embodiments some or all of the I/O devices may be connected directly to one or more system I/O buses.

In some embodiments, the computer system 901 may be a multi-user mainframe computer system, a single-user system, or a server computer or similar device that has little or no direct user interface, but receives requests from other computer systems (clients). Further, in some embodiments, the computer system 901 may be implemented as a desktop computer, portable computer, laptop or notebook computer, tablet computer, pocket computer, telephone, smart phone, mobile device, or any other appropriate type of electronic device.

It is noted that FIG. 9 is intended to depict the representative major components of an exemplary computer system 901. In some embodiments, however, individual components may have greater or lesser complexity than as represented in FIG. 9, components other than or in addition to those shown in FIG. 9 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term "each" does not necessarily equate to the term "all" as the term "all" is used colloquially. For example, the following two phrases have different meanings: "a car having a plurality of tires, each tire of the plurality of tires being fully inflated" and "a car that has all of its tires fully inflated". The former phrase would encompass a car with three fully-inflated tires (the plurality of tires) and one flat tire (not included in the plurality of tires). The latter phrase would not encompass such a car (because not all of the car's tires are fully inflated). Likewise, the phrase "a computer having a set of files, each file of the set of files being read-only" would encompass a computer having two files, one of which is read-only (and belongs to the set of files) and one of which is not read-only (and does not belong to the set of files).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A memory-management method comprising:
    allocating memory within page-aligned real memory storage to requesting processes in contiguous page-sized or smaller memory segments, wherein, during a normal operation mode, pages of the real memory storage are allocated in accordance with a buddy allocation algorithm;
    scanning, during the normal operation mode, the real memory storage for unallocated page-sized or smaller memory segments that cannot be allocated in accordance with the buddy allocation algorithm;

assigning the unallocated memory segments identified from the scan to at least one pool;

during the normal operation mode and responsive to an allocation of a portion of a particular unallocated memory segment in the at least one pool or a deallocation of a memory segment that is a paired buddy with the portion of the particular unallocated memory segment, removing at least the portion of that particular unallocated memory segment from the at least one pool;

detecting a triggering condition; and responsive to the detection, allocating, to a requesting process, at least one contiguous page-sized or smaller memory segment that violates the buddy allocation algorithm, wherein the allocating, responsive to the detection, the at least one contiguous page-sized or smaller memory segment that violates the buddy allocation algorithm to the requesting process comprises:
responsive to the detection, allocating the unallocated memory segments in the at least one pool to requesting processes.

2. The method of claim 1, wherein the triggering condition comprises a lack of unallocated memory segments that are large enough to fulfill received memory requests without violating the buddy allocation algorithm.

3. The method of claim 1, wherein the scanning and the assigning are performed by a system assist processor.

4. The method of claim 1, wherein the at least one memory segment comprises two contiguous buddy memory segments, and wherein the at least one memory segment violates the buddy allocation algorithm by extending across a buddy system boundary.

5. A computer program product for memory management, the computer program product comprising a computer readable storage medium, the computer readable storage medium having program instructions embodied therewith, the programs instructions configured, when executed by at least one computer, to cause the at least one computer to perform a method comprising:

allocating memory within page-aligned real memory storage to requesting processes in contiguous page-sized or smaller memory segments, wherein, during a normal operation mode, pages of the real memory storage are allocated in accordance with a buddy allocation algorithm;

scanning, during the normal operation mode, the real memory storage for unallocated page-sized or smaller memory segments that cannot be allocated in accordance with the buddy allocation algorithm;

assigning the unallocated memory segments identified from the scan to at least one pool;

during the normal operation mode and responsive to an allocation of a portion of a particular unallocated memory segment in the at least one pool or a deallocation of a memory segment that is a paired buddy with the portion of the particular unallocated memory segment, removing at least the portion of that particular unallocated memory segment from the at least one pool;

detecting a triggering condition; and responsive to the detection, allocating, to a requesting process, at least one contiguous page-sized or smaller memory segment that violates the buddy allocation algorithm, wherein the allocating, responsive to the detection, the at least one contiguous page-sized or smaller memory segment that violates the buddy allocation algorithm to the requesting process comprises:
responsive to the detection, allocating the unallocated memory segments in the at least one pool to requesting processes.

6. The computer program product of claim 5, wherein the triggering condition comprises a lack of unallocated memory segments that are large enough to fulfill received memory requests without violating the buddy allocation algorithm.

7. The computer program product of claim 5, wherein the scanning and the assigning are performed by a system assist processor.

8. The computer program product of claim 5, wherein the method further comprises:
responsive to the detection, defragging the real memory storage.

9. A system for memory management, the system comprising:

a computer readable storage medium; and a processor in communication with the computer readable storage medium, the processor configured to obtain instructions from the computer readable storage medium that cause the processor to perform a method comprising:

allocating memory within page-aligned real memory storage to requesting processes in contiguous page-sized or smaller memory segments, wherein, during a normal operation mode, pages of the real memory storage are allocated in accordance with a buddy allocation algorithm;

scanning, during the normal operation mode, the real memory storage for unallocated page-sized or smaller memory segments that cannot be allocated in accordance with the buddy allocation algorithm;

assigning the unallocated memory segments identified from the scan to at least one pool;

during the normal operation mode and responsive to an allocation of a portion of a particular unallocated memory segment in the at least one pool or a deallocation of a memory segment that is a paired buddy with the portion of the particular unallocated memory segment, removing at least the portion of that particular unallocated memory segment from the at least one pool;

detecting a triggering condition; and responsive to the detection, allocating, to a requesting process, at least one contiguous page-sized or smaller memory segment that violates the buddy allocation algorithm, wherein the allocating, responsive to the detection, the at least one contiguous page-sized or smaller memory segment that violates the buddy allocation algorithm to the requesting process comprises:
responsive to the detection, allocating the unallocated memory segments in the at least one pool to requesting processes.

10. The system of claim 9, wherein the triggering condition comprises a lack of unallocated memory segments that are large enough to fulfill received memory requests without violating the buddy allocation algorithm.

11. The system of claim 9, wherein the scanning and the assigning are performed by a system assist processor.

* * * * *